Patented Apr. 1, 1941

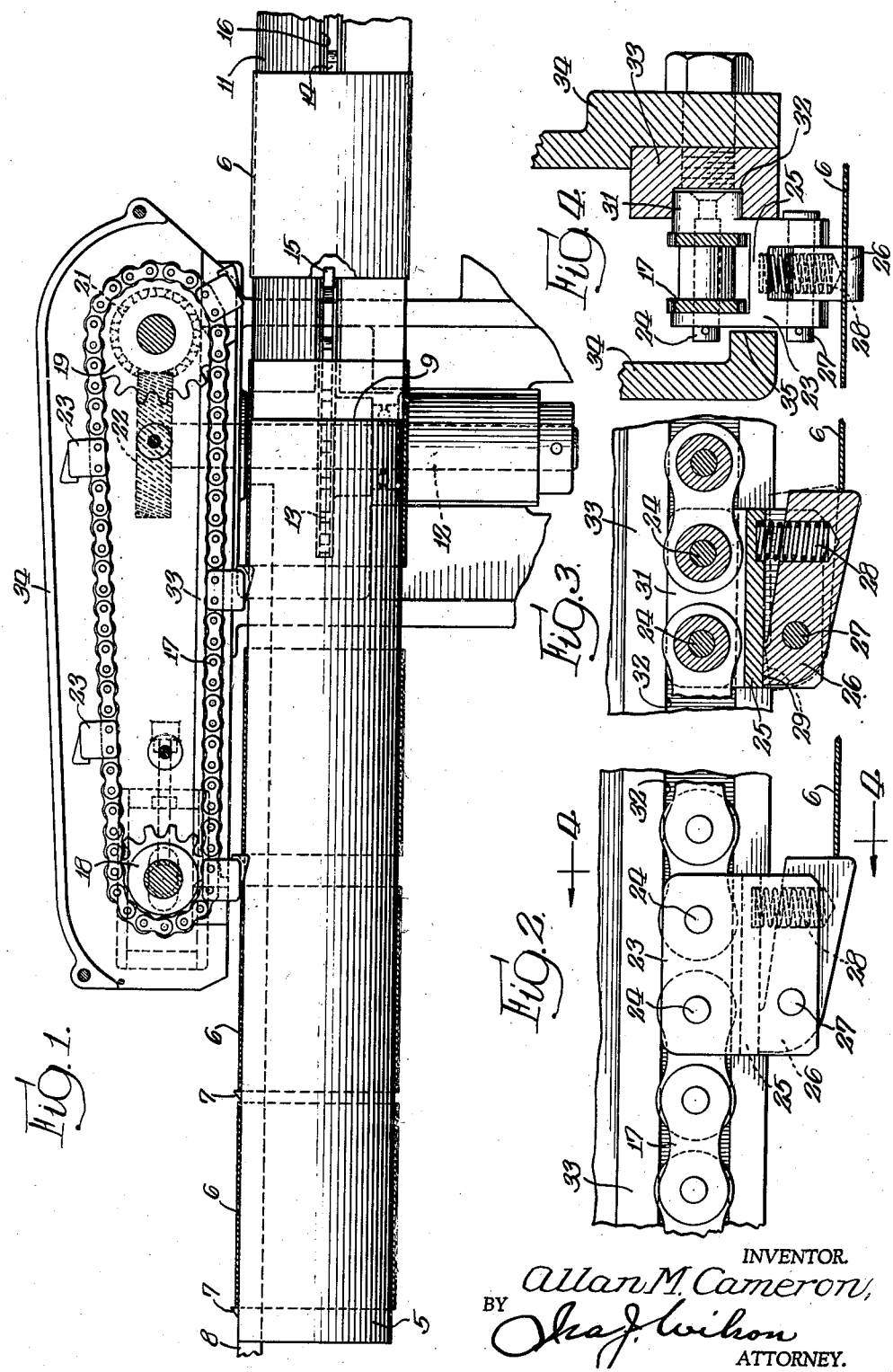

2,236,747

UNITED STATES PATENT OFFICE 2,236,747

FEEDING DEVICE FOR CAN BODIES

Allan M. Cameron, Chicago, Ill., assignor to Cameron Can Machinery Co., Chicago, Ill., a corporation of Illinois Application February 23, 1939, Serial No. 257,800

3 Claims. (Cl. 198—170)

This invention pertains to the making of tin can bodies and more particularly to a device for feeding or advancing the bodies during their production.

In my prior application, Serial No. 143,715, filed May 20, 1937, now Patent No. 2,203,403, I disclosed a transferring mechanism for transferring the formed bodies from the body maker to the soldering attachment, the mechanism in that instance comprising a chain equipped with feed dogs for successively engaging the rear edges of the can bodies on the body maker horn and transferring them in timed relation with the feed mechanism of the soldering attachment from the body maker into the soldering attachment. It has developed in practice that the feed dogs of the transferring mechanism disclosed in said application have a tendency to depress or bend inwardly the rear edges of the can bodies contacted by the dogs, with the result that such bodies are deformed to an extent which interferes with subsequent operations to which they are subjected.

The primary purpose of my present invention is to provide a feeding device which, while capable of employment for feeding can bodies at other points in their process of manufacture, is particularly suitable for use in the transfer mechanism for transferring the can bodies from the body maker to the soldering attachment. The purpose of my invention is to effect this transfer without damaging the bodies.

With this end in view, my invention contemplates the provision of a feed dog and its mounting which are so constructed that the feeding face of the dog is maintained in the requisite position with respect to the body so that no injury to the body can be produced. The features by which this result is attained reside in the structure of the dog itself, in its mounting, and in the structure by which the mounting is carried and guided during its movements, all of which will be later explained more in detail.

For the purpose of facilitating an understanding of my invention, I have illustrated on the accompanying drawing a preferred embodiment thereof from reference to which when considered in connection with the following description the invention and its advantages should be readily appreciated.

Referring to the drawing:

Fig. 1 is a fragmentary elevation showing my invention as applied to a transferring mechanism for transferring can bodies from a body maker to a soldering attachment;

Fig. 2 is a fragmentary enlarged elevation showing one of the feed dogs and its mounting;

Fig. 3 is a sectional view of the structure of Fig. 2; and

Fig. 4 is a transverse sectional view on the line 4—4 of Fig. 2.

Referring to the drawing more in detail, reference character 5 indicates the rear end of the horn of a body maker adapted to form blanks into cylindrical bodies 6 and lock the overlapping edges together. The bodies are fed along the horn from the forming station by feed dogs 7 carried by a reciprocatory feed bar 8 in the usual manner. The horn 5 terminates at 9, and adjacent thereto and in alignment therewith is positioned the external horn 11 of the soldering attachment. The details of the operating mechanisms of the body maker and the soldering attachment by which the solder is applied to the side seams of the formed bodies may be of standard or preferred construction well-known in the art, and no disclosure thereof is here necessary.

A suitably driven, vertically disposed shaft 12, adjacent the rear end of the body maker horn, carries a sprocket wheel 13, over which is trained a sprocket chain 14, carrying feed dogs 15 which project into the interior of the external horn 11 through a longitudinally extending slot 16 in the side wall of the horn. This feed chain feeds the can bodies in succession along the soldering attachment.

To transfer the bodies from the horn 5 into the horn 11 and in timed relation with the feed chain 14 so that each can body will be properly positioned to be picked up by its feed dog 15, I have provided a transferring mechanism comprising a sprocket chain 17 trained over the adjustable idler sprocket wheel 18 and the driving sprocket wheel 19 which is driven by the worm gears 21 and 22 from the upper end of shaft 12.

This chain is positioned to overlap the horns 5 and 11 and is equipped with feed dogs designed to transfer the bodies from the position where they are left by the rear dog 7 into position to be picked up by the dogs 15. My invention is concerned particularly with the feed dogs of this transferring mechanism, the details of which will now be described.

The chain 17 is equipped at regularly spaced intervals with mountings 23, each straddling a chain link and attached to the chain by two connecting pins 24 passing through the mounting and through the chain. The depending portion of each mounting below the cross wall 25 is bifurcated to accommodate a feed dog 26 pivotally mounted upon a pin 27. The dog is normally urged into operative position, shown in Fig. 2, by an expansion spring 28 interposed between the dog and the wall 25. The feeding face of the dog, which engages the rear edge of the can body, is held in vertical position and prevented from tilting too far by engagement of the flat surface 29 of the dog tail with the bottom face of wall 25. The dog thereby is prevented from being projected by the spring 28 into a position which would dispose its feeding face at an incline to the vertical, which would tend to bend inwardly and disfigure the engaged edge of the can body.

For the purpose of holding each mounting in predetermined position during its travel so as to prevent tilting thereof, which would produce similar tilting of the dog, one side face of each mounting is provided with an elongated extension 31 which projects into and travels along a straight guide groove 32 formed in the face of a guide member 33 fixedly carried by the housing 34 within which the transfer mechanism is disposed. The guide extension 31 is of substantially the same length as the mounting 23 so that a bearing surface of substantial length is provided which precludes the mounting from tilting away from the horizontal as it travels along the guide groove. Sidewise movement of the chain itself is prevented by the side walls of a groove 35 formed in the bottom of the housing and through which the mountings 23 project.

It will be apparent from the foregoing that I have provided a feeding device in which each feed dog mounting is accurately guided and retained in position during its travel, and each feed dog is so mounted in its mounting that deviation from the vertical of its front or feeding face is prevented. The feeding face of each dog is therefore presented squarely against the rear edge of the body to be transferred, and the advancing movement of the body is accomplished without angular pressure upon its edge which would be likely to cause bending and distortion thereof.

In case the body maker should be stopped with a formed body positioned beneath instead of rearwardly of a feed dog as it moves downwardly and rearwardly around the sprocket wheel 18, the lower edge of the feed dog will, in such instance, engage the upper surface of the body and will be tilted upwardly against the force of spring 28 into the dotted line position shown in Fig. 3 so that it will simply slide along the body without injury thereto. When the body maker is again started up, the partially advanced body will be moved by the feed dog 7 to a position where it will be picked up by a succeeding dog 27 in a normal manner.

While I have shown and described a preferred construction for accomplishing the desired purposes above outlined, it should be manifest that the structural details may be varied within considerable limits without departing from the essence of my invention as defined in the following claims.

I claim:

1. A feeding device for can bodies comprising a carrier, a dog mounting carried thereby consisting of a frame having a bifurcated lower portion and a lateral guiding extension, means cooperating with said extension to prevent tilting movements of the mounting, a dog pivoted on the mounting, and a spring acting between said mounting and said dog for urging said dog into operative position with one end thereof spaced from the mounting, said dog being provided with a shoulder cooperative with a surface on the mounting to limit the extent of projection of said dog by said spring.

2. A feeding device for can bodies comprising a carrier, a dog mounting, a feed dog pivoted near one end thereon, a spring yieldingly urging the other end of said dog away from the mounting into operative position, abutment means comprising a shoulder on the dog cooperable with said mounting for limiting the movement of said dog under the influence of said spring, and means comprising a stationary guide groove and an elongated lateral projection from the mounting extending into and disposed lengthwise in said groove for preventing tilting movements of the mounting.

3. A feeding device for can bodies comprising a dog mounting, a carrier therefor, a dog pivoted on the mounting, means including an abutment on one end of the dog engageable with the mounting for limiting the tilting movements of the dog so as to present the feeding face thereof perpendicular to the line of travel of the can body, a spring biasing said dog toward said perpendicular position, and means including a laterally opening guideway and an elongated extension projecting laterally from and extending longitudinally of the mounting into said guideway for preventing tilting movements of the mounting to insure said perpendicular position of the dog feeding face.

ALLAN M. CAMERON.